A. F. BADER.
DEPOSIT RECEIPT BANK BOOK.
APPLICATION FILED NOV. 14, 1917.
1,289,601.
Patented Dec. 31, 1918.
2 SHEETS—SHEET 1.
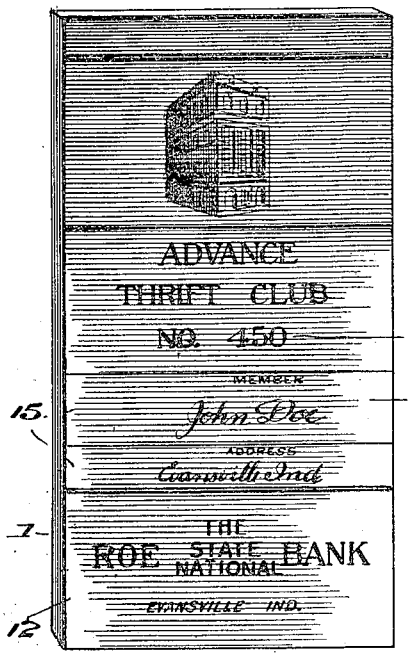
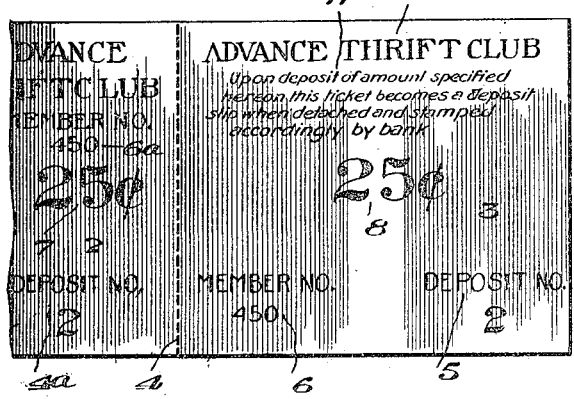
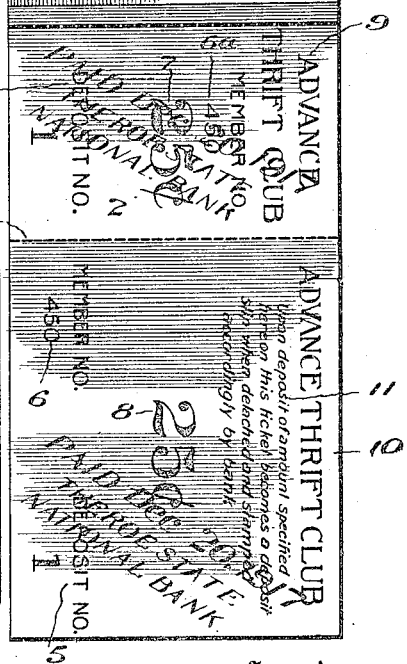

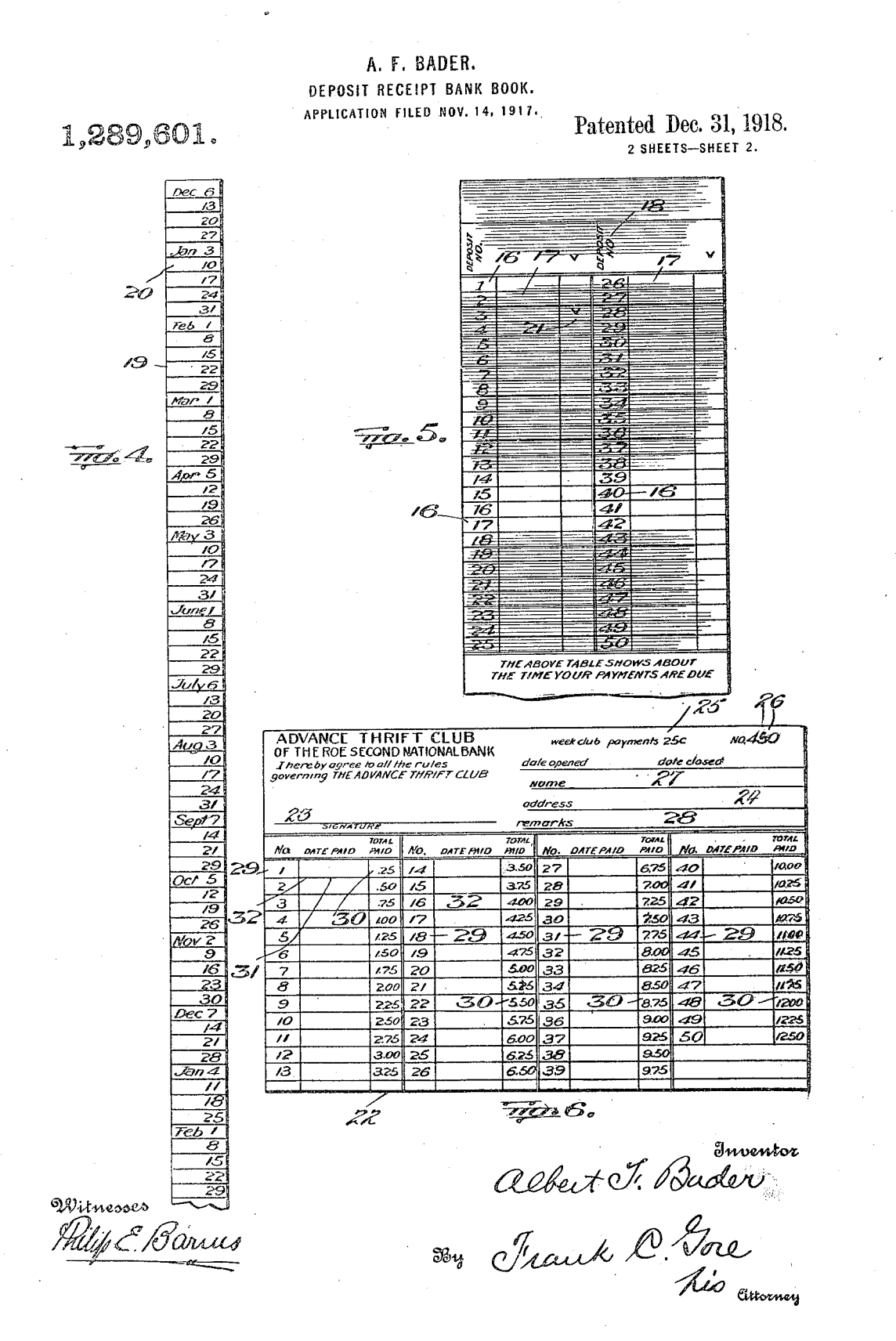

A. F. BADER.
DEPOSIT RECEIPT BANK BOOK.
APPLICATION FILED NOV. 14, 1917.

1,289,601.

Patented Dec. 31, 1918.
2 SHEETS—SHEET 2.

UNITED STATES PATENT OFFICE.

ALBERT F. BADER, OF EVANSVILLE, INDIANA.

DEPOSIT-RECEIPT BANK-BOOK.

1,289,601.　　　　　Specification of Letters Patent.　　Patented Dec. 31, 1918.

Application filed November 14, 1917. Serial No. 202,053.

*To all whom it may concern:*

Be it known that I, ALBERT F. BADER, a citizen of the United States, residing at Evansville, county of Vanderburg, and State of Indiana, have invented certain new and useful Improvements in Deposit-Receipt Bank-Books, of which the following is a specification.

This invention relates to deposit receipt bank books.

Thrift, savings and Christmas accounts are now commonly carried by banks and similar institutions on the part payment or periodic instalment payment plan, and it has been customary to provide the depositor with a coupon book which is presented whenever a payment is made, some receipt being given by the clerk or teller to the depositor, which usually assumes the form of an acknowledgment in the coupon deposit book of the customer. In connection with such savings systems there has heretofore generally been employed a bookkeeping system involving considerable time and expense, not only in keeping track of the deposits of the various depositors and the condition of their accounts but also in giving proper receipts to the depositor.

My invention relates to that general class of deposit book which contains a series of corresponding stubs and coupons each having a definite money value representing an amount which must be paid not later than a given series of dates, usually weekly, the whole representing the aggregate of the amount to be deposited as agreed upon between the bank and the depositor. When a periodic payment is made, the clerk or teller stamps the stub and coupon corresponding to the particular payment, detaches the coupon and retains it, and hands the book back to the depositor. Posting is made at the bank from the detached coupon to the given depositor's account. Heretofore banks have commonly used a signature card on which the solicitor obtains the depositor's signature with a view to opening the account, and a separate account card on which is posted the payments as they are made at the bank.
In the practical operation of Christmas instalment accounts, such as heretofore specified, it has been found desirable to have all accounts start on a given date for otherwise confusion results as to the specific dates on which each account requires an instalment payment. With periodic thrift or savings accounts difficulty has been experienced and much time consumed in consulting the calendar to determine the dates when payments must be made on an account opened on a given date, as the weekly payment dates for one account will vary from those of many other accounts.

As a high rate of interest is paid on savings club accounts on what is termed "average balances," such accounts have often shown losses to banks, as the greater the number of accounts secured, the greater has been the loss, the effect being cumulative. This has been due partly to the payment of commissions to solicitors but largely to the high cost of keeping the system going and the stationery necessary for each account.

One of the objects of my invention is the simplification of a thrift or Christmas deposit book and the bookkeeping system used by the bank in keeping track of this character of account. The invention pertains, more particularly, to the deposit receipt bank book held by the depositor. I have, however, eliminated the signature card as a separate article and combined such card with the account card. The solicitor uses the actual account card retained by the bank when he obtains the customer's signature and initial payment and thereby eliminates one of the two visits heretofore required to be made on the customer. This is of particular advantage to prevent the great rush encountered by banks around Christmas time, and it lessens, if not entirely eliminates, the hiring of extra clerks. The same advantages inhere in this part of the invention in respect to savings club or thrift accounts. The combined signature and account card contains the depositor's signature and address, and all data regarding that particular account, including the number of the account, the class or denomination, the number of deposits or payments, and the increasing aggregate of deposits as time passes, with spaces provided for the entry of dates of deposits or payments. The paid coupons detached from the depositor's book are posted direct to this card by entering date of deposit or payment thereon. The card shows at a glance the number of deposits or payments and their total.

My improved deposit receipt bank book comprises a plurality of stubs and coupons, each bearing the depositor's account number, the monetary value of the instalments, and the numbers of the consecutive stubs and coupons which comprise the book. I dispense with all symbols, colors, designating or identifying marks, or the like, which indicate the "class" or denomination of the account. The value of each stub and coupon appears on its face and is the sole indicia employed for that purpose. For instance, an account calling for the deposit of 25¢ per week, or any other period of time, is represented on the deposit receipt book of my invention by the indicia "25¢." It could be represented solely by the numerals "25." An account requiring a weekly deposit or payment of 50¢ would be represented by a deposit book on the stubs and coupons of which appears "50¢." Each stub and its attached coupon is numbered serially throughout the book, the first stub and coupon bearing the indication "Deposit No. 1;" the second stub and coupon "Deposit No. 2," etc. The stubs and coupons all bear the number of the account as, for instance, "450," which indicates that the member's account is No. 450. The combined signature and account card retained by the bank bears a corresponding number such as "450." The teller or clerk when posting simply seeks the given account No. 450 and posts the particular deposit or payment thereon.

When making a deposit or payment the depositor presents the coupon book with the money required at that time. The teller then stamps with any suitable "Paid" or other stamp both the coupon and the stub, detaches the coupon and places it in a file for posting, or, it may be immediately posted on the member's account card. The book is returned to the depositor and is again presented when a subsequent deposit or payment is made. The depositor can immediately determine from the stubs in his book which are stamped "Paid" or otherwise, the number of deposits or payments he has made. However, as will presently appear, the teller or clerk may also check on the improved payment calendar carried by the cover of the book the particular payment made.

In my deposit receipt bank book I entirely eliminate any space for the provision of a validating signature and thereby relieve the bank of the necessity of any validating act other than the well known commercial expedient of stamping the stub and coupon with a "Paid" or other stamp. This alone relieves the bank of the loss of considerable time and the incurring of much additional expense in giving the depositor a receipt for his deposit or payment.

Where the account is to mature at a fixed date and must be started on a given date, as, for instance, a Christmas savings account, no particular difficulty may be experienced regarding the dates for making deposits or payments although the bank may be put to considerable loss on books and account cards which are not used in a given year for such a purpose. With savings club accounts which may start at any date, it has been a troublesome matter to indicate the dates of payment to the depositor as they would vary with different accounts.

My invention comprises, still further, an automatic periodic payment calendar which can be arranged so that the account may be started on any date and the calendar will automatically, as it were, indicate to the depositor and teller the dates on which the subsequent deposits or payments fall due so that at all times the depositor will be able to determine within a few days of due date when his next deposit or payment is due and the number thereof. The automatic calendar may be prepared to contain any desired number of dates running from less than a year to two or more years, in the aggregate, but, by preference, in an account covering, say, a period of fifty weeks, the calendar will be arranged to represent a period of a year and several months. The average person will not start his payments near the last of the year and therefore on such accounts a period of more than a year should be represented. This part of my invention comprises a table giving the numbers of the consecutive payments, and a strip on which appears dates by months and days of the months, at weekly intervals. The strip is pasted or otherwise affixed so that the first date of payment will coincide with the first payment number and subsequent periodic payments will be disposed opposite the payment numbers following. The surplus parts of the strip, before and after the period covered by the account, are cut off. When a depositor opens the account as, say, on December 20, the words "Dec. 20" will be pasted directly opposite the figure 1 on the table representing the first payment and the last payment will then show opposite the last number of the table. The first and last parts of the strip will be severed as they are not needed.

The embodiment of the invention hereinafter set forth and which is shown in the accompanying drawings is susceptible of modification in non-essential particulars.

In the accompanying drawings—

Figure 1, is a front view showing the book closed;

Fig. 2, similar view showing the book open;

Fig. 3, a face view of the second deposit coupon and its stub;

Fig. 4, a view of the date strip before it has been affixed to the book;

Fig. 5, a view of the inside of the cover before the date strip has been affixed thereto; and Fig. 6, a view of the combined signature and account card.

The deposit receipt bank book which the depositor is given when the account is opened comprises leaves 1 of a number corresponding to the number of instalment payments. For instance, if the account contemplates fifty consecutive payments at weekly intervals, there would be fifty of the leaves 1. Each leaf comprises a stub 2 and a coupon 3 detachable therefrom along a weakened or perforated line 4. The stubs and coupons bear consecutive numbers throughout the series of leaves 1. Suitable designation as at 4ª on the stub and 5 on the coupon as, for instance, "Deposit No. 1" is used. The first of leaves 1 bears on both the stub and the coupon the number "1"; the second leaf bears on both the stub and the coupon the number "2"; the third leaf the number "3", etc. The account number or the membership number appears on both the stub and coupon at 6 and 6ª respectively, as for instance, "Member No. 450". Each stub and coupon bears this number so that both the depositor and the bank can readily identify the book with the account.

I do away entirely with special "class" designations and all colors, symbols, or the like, for that purpose. The exact amount of the payment to be made is represented at 7 on the stub and 8 on the coupon. Each stub and each coupon bears this designation. If the instalment payment is 25¢, this designation will appear at 7 and 8 as "25¢". If the amount is 50¢, the designation will be "50¢".

Other suitable matter such as shown at 9 on the stub and 10 on the coupon identifies them with the particular club or bank where the account is entered. The coupon may also have any suitable directions a shown at 11.

One of the covers 12 may bear any suitable directions, not shown, covering the rules governing the account. The front cover 13 may bear any suitable directions and the name of the bank or institution with which the account is kept. The cover also may have the number of the account, as shown at 14, and spaces 15 for the name and address of the depositor.

The inside of the front cover is provided with a table comprising consecutive payment or deposit numbers 16 with blank spaces 17 defined by horizontal rulings. There are also checking columns 18 which the rulings cross. If the account calls for fifty consecutive payments, the numbers in the columns 16 will run from 1 to 50 inclusive, each number being opposite one of the horizontal spaces 17. Instead of printing a set number of dates in the spaces 17 to represent the dates of payment of the consecutive payments represented by the columns 16, as has heretofore been proposed, or being put to the necessity of inscribing in pen the actual periodic dates of payment in these spaces, I provide a date strip 19 which may cover any desired period of time, preferably a year and a few months over although this strip might cover two, three or more years. The strip 19 has dates by months and days of the months representing periods one week apart, assuming the payments are to be made weekly. If made semi-monthly, monthly, or at any other set periods, the dating would be changed. The printed months and days of the months are shown at 20. The back of the strip 19 may be gummed so that it can be moistened and applied to the columns 17, or, the columns may be provided with an adhesive, or, resort may be had to an adhesive applied at the time the account is made up, for the purpose of pasting the strip 19 to the columns 17. When a depositor opens the account, making his deposit, say, on Dec. 20, the clerk or teller will paste the strip 19 so that the date "Dec. 20" or nearest date thereto will appear opposite the payment "No. 1" in the column 16. All consecutive dates, after Dec. 20, will then appear, in order, opposite the numbers 2, 3, 4, 5, 6, etc. Surplus parts of the strip 19 in advance of December will be cut and those following Nov. 9, the last date of payment, will be likewise severed. When a payment is made a check mark is entered in the checking column 18 opposite that particular payment as shown at 21.

In Fig. 6, is shown the account card kept in the bank to keep track of the payments. This card 22 is a combined signature and account card. The solicitor takes the original account card to the subscriber and obtains the signature of the latter at 23. The address is filled in at 24 and the amount of the weekly payment at 25. Other spaces are provided at 26, 27 and 28 for the entry of desirable or necessary information. The card bears the numbers of the payments, consecutively arranged, in the columns 29. Other columns 30 arranged in connection in cross rulings 31, show the total amounts represented by the payments whose numbers appear in columns 29. The intermediate spaces 32 are for the entry of the dates on which payments are made.

Having numbered the card 22 with the member's number, as, for instance, "450" and the depositor's book being correspondingly numbered (printed or otherwise), and obtained the depositor's signature at 23 and other data needed, the deposit book is handed the depositor who then makes his first payment which is receipted for by stamping the stub 2 and the coupon 3 with any suitable "Paid" stamp. Such a stamp bears the date of deposit or payment and may also bear the name of the bank with which the account is kept. I may, if desired, have the bank employ a duplex stamp, a part of which appears on the stub and a part on the coupon. The coupon 3, after stamping, is detached and the book returned to the depositor who again presents it when making deposit No. 2. The coupon 3 shows the number of the account and enables the clerk or bookkeeper to post the payment in the space 32 by writing or stamping the date thereon. Thus, payments are kept track of at the bank as they are made. When all payments are made, the book of stubs may either be surrendered to the bank or retained as the card shows that full payment has been made.

My deposit receipt bank book and account card eliminate considerable expense for stationery and minimize bookkeeping operations, thereby materially cutting down the cost of installing such a system, and enabling banks to use it without incurring loss and, on the contrary, enabling them to operate the system at a material gain, and saving of time.

By the use of the present invention an account can be started at any time of the year, independently of all other accounts.

Track can be kept of accounts by taking a separate date strip 19, in the absence of the deposit receipt book, and laying it alongside of the account and signature card, thereby determining just how far the depositor is delinquent by applying the proper dates and scale to fit the lines.

What I claim is:—

1. A deposit receipt bank book comprising a plurality of sheets each composed of a coupon and a stub, the stubs and coupons of successive sheets being provided with consecutively arranged indicia showing their sequence, the aggregate of the sheets representing a series of payments to be made to complete an agreed financial transaction during a plurality of months, a backing attached to the book having consecutively arranged indicia representing in number and extent the series of payments represented by the successive leaves, and a member which is attachable to said backing having a series of consecutively arranged dates comprising months and days of the month which correspond in periodicity and number to the periods or intervals occurring between the agreed periodically recurring dates of payment of the foregoing order, said member being adapted to be selectively arranged on the backing with the dates thereof disposed opposite the series of aforesaid indicia, commencing with any selected date.

2. A deposit receipt bank book comprising a plurality of sheets each composed of a coupon and a stub, the stubs and coupons of successive sheets being provided with consecutively arranged indicia showing their sequence, the aggregate of the sheets representing a series of payments to be made to complete an agreed financial transaction during a plurality of months, a backing attached to the book having consecutively arranged indicia representing in number and extent the series of payments represented by the successive leaves and a strip which is attachable to said backing having consecutively arranged dates comprising months and days of the month which correspond in periodicity to the periods or intervals occurring between the agreed periodically recurring dates of payment of the foregoing order, the series of dates on said strip being in excess of the number required by the consecutively arranged indicia on the backing, whereby any desired date may be selected to appear in conjunction with a given one of the series of indicia.

In testimony whereof, I hereunto affix my signature.

ALBERT F. BADER.

Copies of this patent may be obtained for five cents each, by addressing the "Commissioner of Patents, Washington, D. C."